US010782170B1

(12) United States Patent
Guin et al.

(10) Patent No.: US 10,782,170 B1
(45) Date of Patent: Sep. 22, 2020

(54) METHOD AND APPARATUS TO BALANCE A CORIOLIS MASS FLOW METER ADDING BALANCING WEIGHTS BY DETERMINING REACTION FORCES (71) Applicant: IDEX India PVT. LTD, Vadodara (IN)

(72) Inventors: Subhasish Guin, Vadodara (IN); Donald Reed Cage, Longmont, CO (US)

(73) Assignee: IDEX India PVT. LTD, Vadodara (IN)

( * ) Notice: Subject to any disclaimer, the term of this patent is extended or adjusted under 35 U.S.C. 154(b) by 0 days.

(21) Appl. No.: 16/801,551

(22) Filed: Feb. 26, 2020

(51) Int. Cl.
*G01F 1/84* (2006.01)

(52) U.S. Cl.
CPC .......... *G01F 1/8422* (2013.01); *G01F 1/8427* (2013.01); *G01F 1/8477* (2013.01); *G01F 1/8486* (2013.01); *G01F 1/8495* (2013.01)

(58) Field of Classification Search
None
See application file for complete search history.

(56) References Cited

U.S. PATENT DOCUMENTS

| | | | |
|---|---|---|---|
| 4,491,025 A | 1/1985 | Smith et al. | |
| 4,756,198 A | 7/1988 | Levien | |
| 5,398,554 A | 3/1995 | Ogawa et al. | |
| 5,979,246 A | 11/1999 | Van Cleve et al. | |
| 6,070,474 A | 6/2000 | van der Pol et al. | |
| 6,336,369 B1 | 1/2002 | Gomi et al. | |
| 6,397,685 B1 | 6/2002 | Cook et al. | |
| 6,439,060 B1 | 8/2002 | Cage | |
| 6,487,917 B1 | 12/2002 | Van Cleve et al. | |
| 6,598,489 B1 | 7/2003 | Van Cleve et al. | |
| 6,883,387 B2 | 4/2005 | Bitto et al. | |
| 7,287,438 B2 | 10/2007 | Van Cleve | |
| 7,628,083 B2* | 12/2009 | Lanham | G01F 1/8409 73/861.355 |
| 2006/0207346 A1* | 9/2006 | Van Cleve | G01F 1/8477 73/861.355 |
| 2008/0034891 A1* | 2/2008 | Van Cleve | G01F 1/8418 73/861.355 |
| 2010/0326203 A1 | 12/2010 | Lanham et al. | |
| 2011/0154914 A1* | 6/2011 | Hussain | G01F 1/8495 73/861.355 |

FOREIGN PATENT DOCUMENTS

CN 101 858 765 A 10/2010
EP 1 431 720 A1 6/2004

* cited by examiner

*Primary Examiner* — Harshad R Patel
(74) *Attorney, Agent, or Firm* — Tucker Ellis LLP; Heather M. Barnes; Michael G. Craig (57) ABSTRACT A Coriolis flow meter comprises a first flow tube having a first end and a second end. The first end comprises a first reaction force, and the second end comprises a second reaction force. A second flow tube is operably connected to the first flow tube. The second flow tube comprises a first end and a second end. The first end comprises a third reaction force, and the second end comprises, a fourth reaction force. A drive system is operably connected to the first and second flow tubes. At least one balance mass is operably attached the first flow tube or the second flow tube. The one balance mass is sized and positioned to minimize one or more of the first reaction force, the second reaction force, the third reaction force, and the fourth reaction force.

18 Claims, 5 Drawing Sheets

METHOD AND APPARATUS TO BALANCE A CORIOLIS MASS FLOW METER ADDING BALANCING WEIGHTS BY DETERMINING REACTION FORCES

BACKGROUND

A Coriolis mass flow meter is a device that measures the mass flow rate of a fluid passing therethrough generally by employing one or more vibrating tubes that carry the fluid to be measured. The moving mass of the flowing fluid, in combination with the vibration of the tubes causes Coriolis forces to bare on those tubes, which alters their vibration pattern in a way that is measurable. The magnitude of this altered vibration pattern is proportionally related to the mass flow rate of the fluid.

There are many difficulties that arise in the measurement of these altered vibration patterns due primarily to their magnitude which is exceedingly small. The magnitude of the Coriolis induced motion can range from 0.01 mm down to a nanometer or less depending on the design of the flow meter and the magnitude of mass flow rate going therethrough. The smallest measurable motions—sometimes called the resolution or the zero stability is an important factor since that is the minimum flow rate that can be detected by the meter. Any errors in the measurement that are larger than this zero stability value appear as false flow signals on the output of the meter's electronics and therefore are counted as flow when no flow exists.

While there are many causes for errors in the Coriolis deflection measurement, one of the most prevalent errors is due to imbalance in the vibrating tube system. Historically, the importance of good balance was not originally known, so early tube systems were poorly balanced if at all.

Accuracy ratings in a laboratory are important benchmarks, however, in actual field applications many additional factors come into play to cause errors including pipeline vibrations from pumps, pressure and fluid pulsations in the pipe, motor vibrations, and other vibrating equipment that may be mounted nearby the flow meter. These ambient vibrations that are transferred into the Coriolis metering tube system can cause zero-stability errors that cannot be properly corrected. In addition to ambient vibrations, a poorly balanced tube system creates its own vibrations which bear onto the meter body and pipeline system to which it is attached, which cause further measurement errors. All these errors are greatly exacerbated if the vibrating tube system is not properly balanced. A balanced tube system is far more immune to the influence of ambient vibrations and far more immune to generating its own vibrations than a poorly balanced tube system. Therefore, it would be a great advancement in Coriolis flow measurement technology to disclose a method and apparatus to improve the balance of a Coriolis flow meter tube system that is immune to ambient vibrations.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A solution is disclosed for balancing a Coriolis mass flow meter involving the use of one or more balancing weights that may be sized and positioned to minimize or eliminate susceptibility to errors due to pipeline vibrations and changes in mounting conditions. Size and positioning of the one or more balancing weights may be determined by reaction forces at the base of a first flow tube and a second flow tube.

A Coriolis flow meter may comprise a first flow tube having a first end and a second end. The first end may have a first reaction force, and the second end may have having a second reaction force. A second flow tube may be operably connected to the first flow tube. The second flow tube may have a first end and a second end. The first end may have a third reaction force, and the second end may have a fourth reaction force. A drive system may be operably connected to the first flow tube and the second flow tube. At least one balance mass may be operably attached the first flow tube or the second flow tube. The one balance mass may be sized and positioned to minimize one or more of the first reaction force, the second reaction force, the third reaction force, and the fourth reaction force.

A method to balance a Coriolis mass flow meter tube structure, may comprise the following steps:
 determining reaction forces in the x, y, and z direction at a base of a first flow tube and a second flow tube;
 combining the reaction forces;
 determining a first reaction force cancellation value;
 adding at least a first balance mass to the first flow tube at a first location and a second balance mass to the second flow tube at a second location;
 determining a second reaction force cancellation value;
 determining a change between the first reaction force cancellation value and the second force reaction cancellation value; and,
calculating an optimized location and mass for the at least first balance mass and the at least second balance mass so that the change between the first reaction force cancellation value and the second force cancellation value is substantially zero.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

One implementation discloses both a method and apparatus to achieve improved balance for a Coriolis mass flow meter. This improved balance directly improves the accuracy of mass flow measurement especially in adverse field conditions where problems of ambient vibration of appurtenant pipes, structures, and equipment are present.

The advantages of one implementation are achieved by first using a method to determine a specific mass value and one or more specified locations for that mass to be attached to the vibrating tube structure. This addition to the tube system is designed to minimize reaction forces at the connection point between the tube system and the body of the meter from both the normal driven vibration of the tubes, and by the altered vibration shape that is caused by the Coriolis forces. By minimizing or eliminating these reaction forces, and without resorting to use of momentum calculations between the tubes, the vibrating tube system becomes highly immune from ambient vibrations entering the tube vibration system and causing measurement errors. Similarly, by minimizing or eliminating these reaction forces, less vibration energy is lost to the appurtenant structures and pipelines, which further reduces the meter's susceptibility to zero or near zero stability errors.

The flow tubes of Coriolis flow meters have taken many shapes and sizes. A simple U-shaped tube or tubes were used. Many shapes and sizes may be utilized including without limitation, straight tubes, S-shaped tubes, B-shaped tubes, omega shaped tubes, slightly bent tubes, and others. Regarding size, Coriolis flow meters have employed tubes or pipes ranging in size from less than 1 mm in diameter to more than 12-inch diameter. The apparatus described herein has application to all of these tube shapes and sizes.

Figure 1:
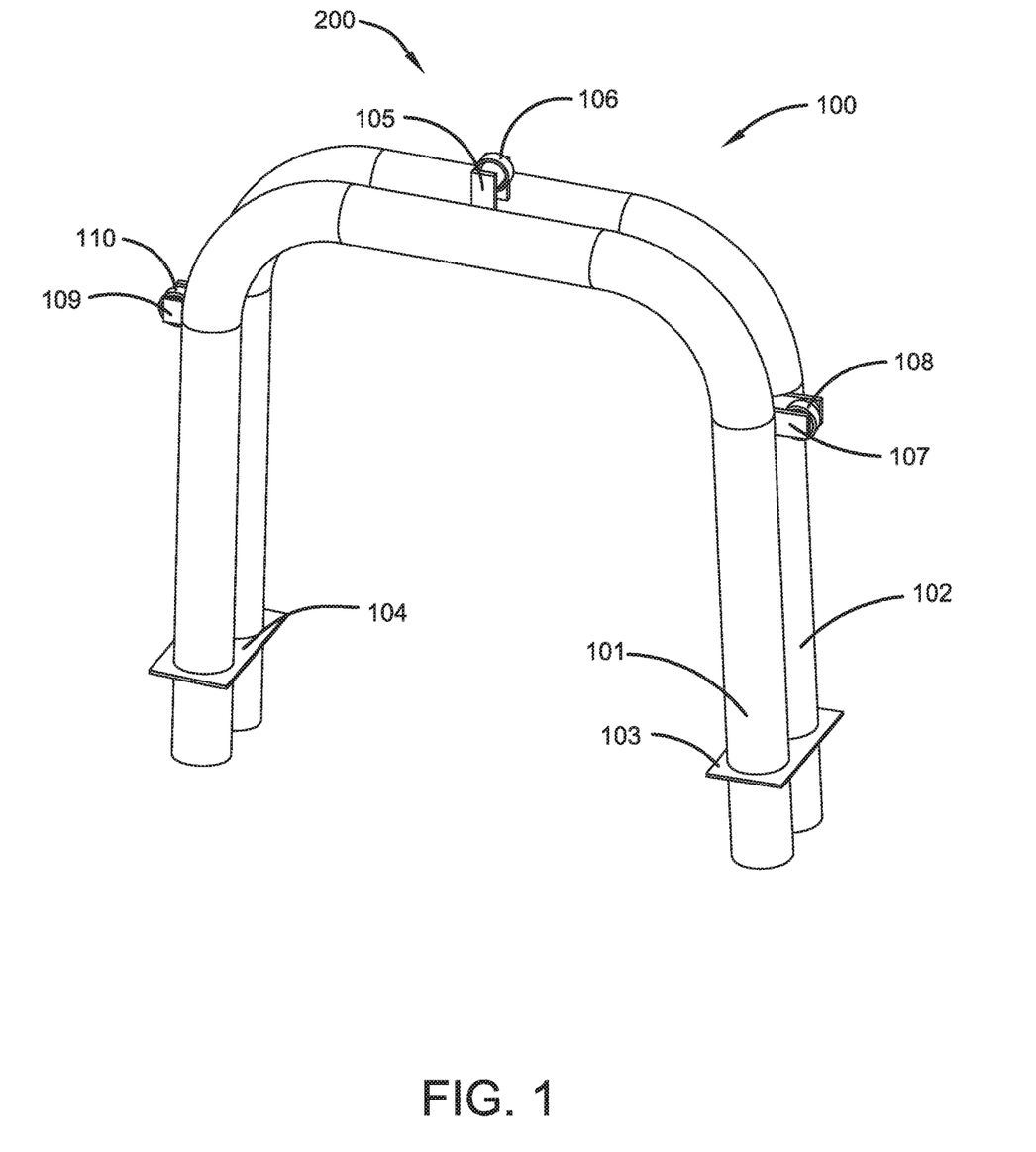
FIG. 1 is an isometric view of an implementation of a device.

The process of implementing one implementation will now be described. Finite element analysis (FEA) is an engineering software program used by Coriolis flow meter engineers to analyze the vibrations on a Coriolis tube meter structure 100. FEA can determine parameters such as tube frequency, deflection of any point on the tube, stress and strain along the tube, and reaction forces where the tubes are attached to the body of the meter, among others. As an example, a pair of tubes, each bent into a general U-shape are shown in FIG. 1. The flow tubes 101 and 102 may be oriented in parallel, next to each other, and may be anchored to a heavier structure, typically a manifold casting (not shown), where the fluid may be split into two parallel streams, and conveyed into the tubes on the inlet side of the meter, and out of the tubes on the outlet side. Above the base of the tubes are connections between the tubes 101, 102, which may be brace-bars 103, 104 in one implementation. The brace-bars 103, 104 may link the two tubes 101, 102 together with a spring like connection to help them vibrate out of phase with each other in a balanced manner in a desired mode of vibration. A drive system 200 may be operably connected to the first flow tube 101 and the second flow tube 102. In another example implementation, the drive system 200 may comprise a motion driving magnet 105 and motion driving coil 106. The motion driving magnet 105 may be operably connected to the first flow tube 101, and the driving coil 106 may be operably connected to the second flow tube 102. In another example implementation, the motion driving magnet 105 and the driving coil 106 may be operably connected to the second flow tube 102 and the first flow tube 101, respectively. In one example implementation, the motion driving magnet 105 and the motion driving coil 106 may be located at the top of the tubes near the center. The motion driving magnet 105 and the motion driving coil 106 are used to cause the requisite vibration by applying oscillatory forces on the tubes at a specified frequency to cause deflections in a specific mode or shape of vibration. Also shown attached to the flow tubes 101, 102 is a motion sensing magnet 107 and a motion sensing coil 108 on the inlet side of the meter, and motion sensing magnet 109 and motion sensing coil 110 on the outlet side of the meter. The drive system 200 and its components may be positioned at the top of the flow tubes 101, 102 as shown in FIG. 1. In another nonlimiting implementation, the drive system 200 may be disposed any place along the flow tubes 101, 102 chosen with sound engineering judgment, for example, the bottom of the tubes 101, 102. In yet another example implementation, the flow tubes 101, 102 may be disposed below the manifold, and the drive system 200 and its components may be operably coupled to the flow tubes.

In other implementations, additional structures may be included onto a tube structure design such as additional motion drivers, additional motion sensors, temperature sensors, accelerometers, and others. All these structures, which may be operably attached to the flow tubes 101, 102, may have an effect on the resulting vibratory motion of the tubes 101, 102, and on the balance and the reaction forces at the base of the tubes.

Figure 2:
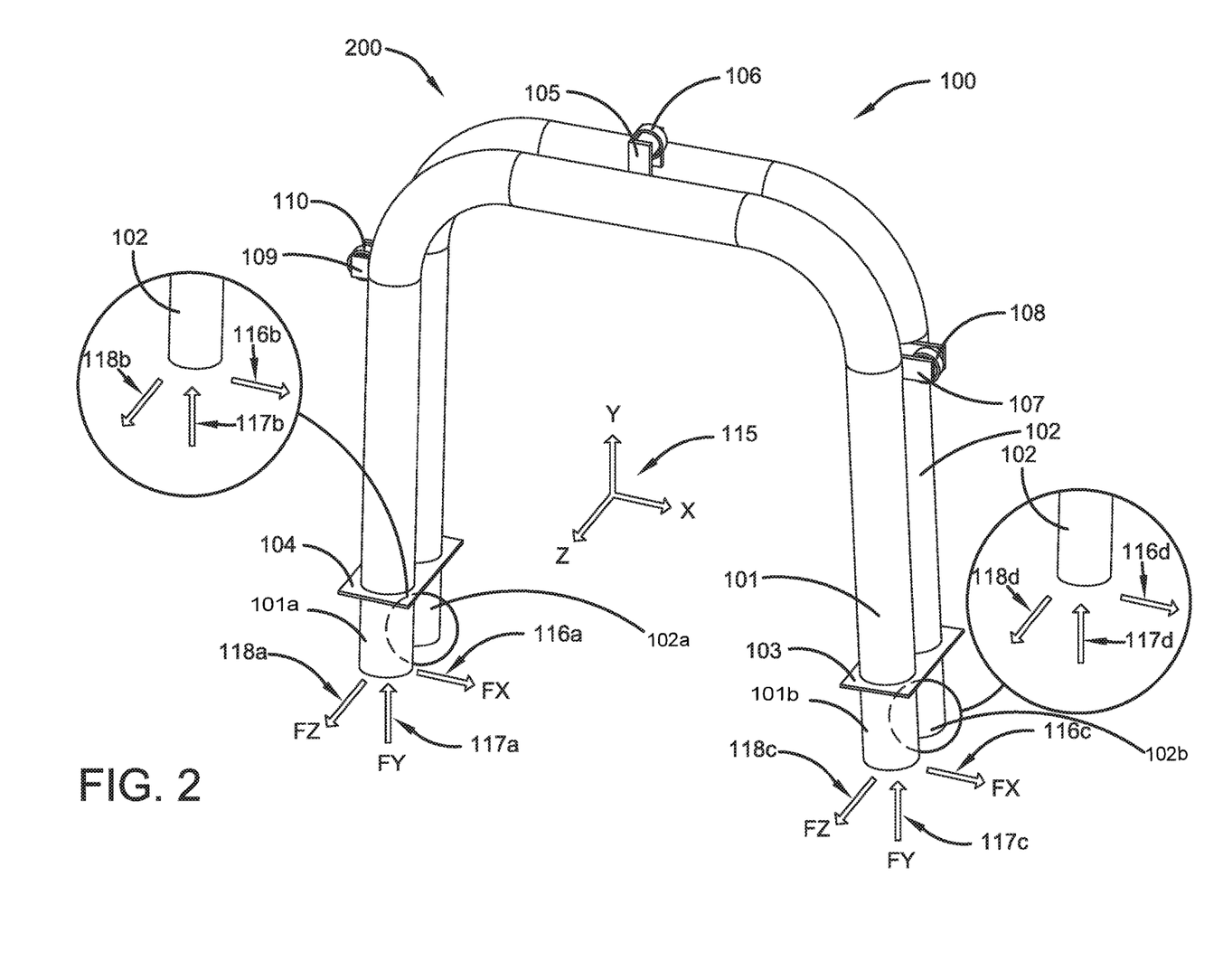
FIG. 2 is an isometric view of the device shown in FIG. 1.

In one implementation, the first flow tube 101 may have a first end 101a and a second end 101b. The second flow tube may have a first end 102a and a second end 102b. In FIG. 2, reaction forces 116, 117, and 118 are shown as forces at the base of one end of the tube 101 in the X, Y, and Z directions respectively. Similar reaction forces are also present at the base of all four tube ends. In one example, reaction forces 116a, 117a, and 118a can be measured proximate the base of the first end 101a of the first flow tube 101. In another example, reaction forces 116b, 117b, and 118b can be measured proximate the base of the first end 102a of the second flow tube 102. The reaction forces 116c, 117c, and 118c may be measured proximate the base of the second end 101b of the first flow tube 101. Reaction forces 116d, 117d, and 118d may be measured proximate the base of the second end 102b of the second flow tube 102. By minimizing or balancing these reaction forces, a balanced condition will result which minimizes, as close to zero as possible, stability errors and susceptibility to errors due to ambient vibrations. In one nonlimiting implementation a first reaction force may be the resultant force of the reaction forces 116a, 117a, and 118a measured proximate the base of the first end 101a of the first flow tube. A second reaction force may be the resultant force of the reaction forces 116b, 117b, and 118b that may be measured proximate the base of the first end 102a of the second flow tube 102. A third reaction force may be the resultant force of the reaction forces 116c, 117c, and 118c measured proximate the base of the second end 101b of the first flow tube 101. A fourth reaction force may be the resultant force of the reaction forces 116d, 117d, and 118d measured proximate the base of the second end 102b of the second flow tube 102. It should be understood that the first reaction force, second reaction force, third reaction force and fourth reaction force may be defined any one of the locations proximate the base of the first flow tube 101 and the second flow tube 102. For example, the first reaction force may be defined proximate the base of one of the flow tubes 101, 102 other than the first end 101a of the first flow tube 101. Likewise the second reaction force may be measured proximate the base of one of the flow tubes 101, 102 other than the first end 102a of the second flow tube 102.

In some implementations, the tubes 101, 102 may have one or more of the masses 111, 112, 113, 114 attached thereto, and it may be helpful to match the masses of oppositely positioned structures on opposite tubes to improve balance. For example, it may be beneficial to match the mass of the motion driving magnet 105 to the mass of the motion driving coil 106. Similarly, it may be helpful to match the mass of the motion sensing magnets 107, 109 to the masses of their respective motion sensing coils 108, 110. However, this matching process may not result in an optimized balanced condition. The method of finding the optimized balanced condition will now be described with reference to FIG. 3.

Figure 3:
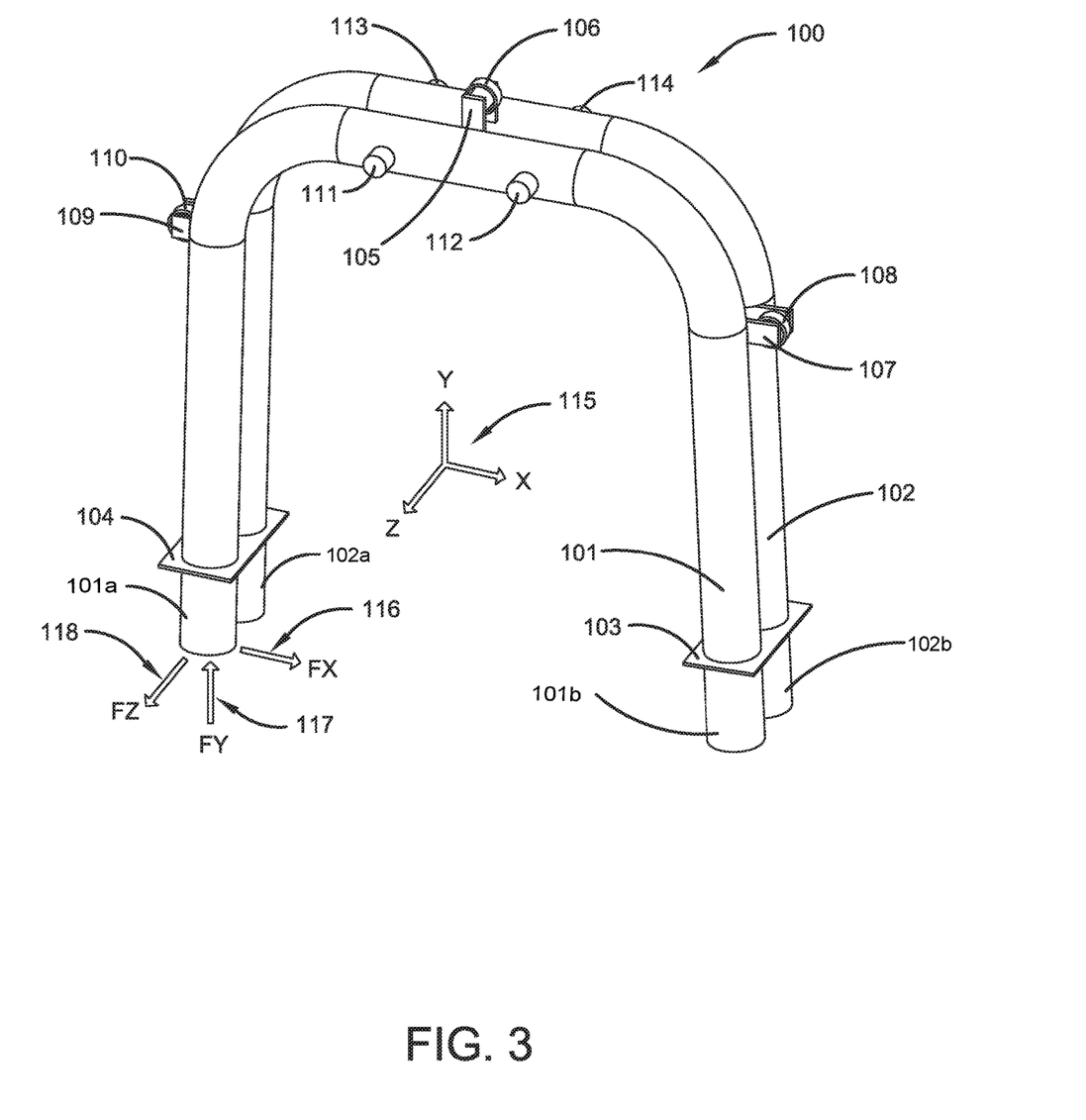
FIG. 3 is an isometric view of the device shown in FIGS. 1 and 2.

FIG. 3 shows the tube structure 100, which also includes balance masses 111, 112, 113, and 114. The mass magnitude and the location of the balance masses 111, 112, 113, 114 have been determined to minimize reaction forces 116, 117, and 118, or cancel these reaction forces with those from the other tube ends in the following way. First the tube structure 100 may be designed to meet normal design specifications such as sensitivity to flow rate, size, weight, frequency, and other parameters. Once the tube structure 100 has met these example design parameters, it can be evaluated for proper balance by comparing the reaction forces 116, 117, 118 to the reaction forces on the other three tube ends to see if these forces cancel each other. By using finite element analysis, the reaction forces at the end of each tube can be determined, and mathematically added together to determine the degree of force cancellation. Normally, there will be found a resultant reaction force or forces that cause imbalance. This imbalance is difficult to avoid in the design process due to the complexity of the tube structure 100 and all of its appurtenant masses as previously described.

Masses 111, 112, 113, and 114 are then added to the FEA model of the tube structure 100 at specified locations symmetrically about the XY plane, and the YZ plane 115 as shown. Reaction forces at the tube ends are then analyzed for cancellation of the reaction forces 116, 117, 118 with the forces from the other tube ends. By moving balance masses 111, 112, 113, 114 to different positions along the tubes 101, 102 in this symmetrical manner, a list of reaction forces as a function of balance mass magnitude and balance mass location can be determined and analyzed for an optimized balanced condition. The optimized balance condition may be achieved when all the specified reaction forces cancel for a specified mode of vibration or a specified deflected tube shape. Normally two modes of vibration may be included in these analyses, which are the driven mode of vibration, often called the drive mode, and the Coriolis reaction mode shape, often called the twist mode. Both of these deflected shapes cause their own set of reaction forces 116, 117, 118. The optimized balanced condition results when all the reaction forces cancel for both deflected shapes.

By using both the drive mode and the twist mode, dynamic balancing is used to size and position the balance masses 111, 112, 113, 114 to directly minimize the measured resulting reaction forces using computational mechanics through FEA. The combined reaction force in the X, Y, and Z directions may be directly minimized by analyzing both the drive mode and the twist mode. Of note, computations utilizing the center of gravity of the tubes or the overall Coriolis flow meter is not used for purposes of this dynamic balancing to minimize or eliminate the combined reaction forces.

Any combination of reaction forces may be utilized for the dynamic balance method described herein. For example, the first reaction force may be the only force needed for the calculation to minimize reaction forces. In another example, the first reaction force and the fourth reaction force may be used in the calculation.

Figure 4A:
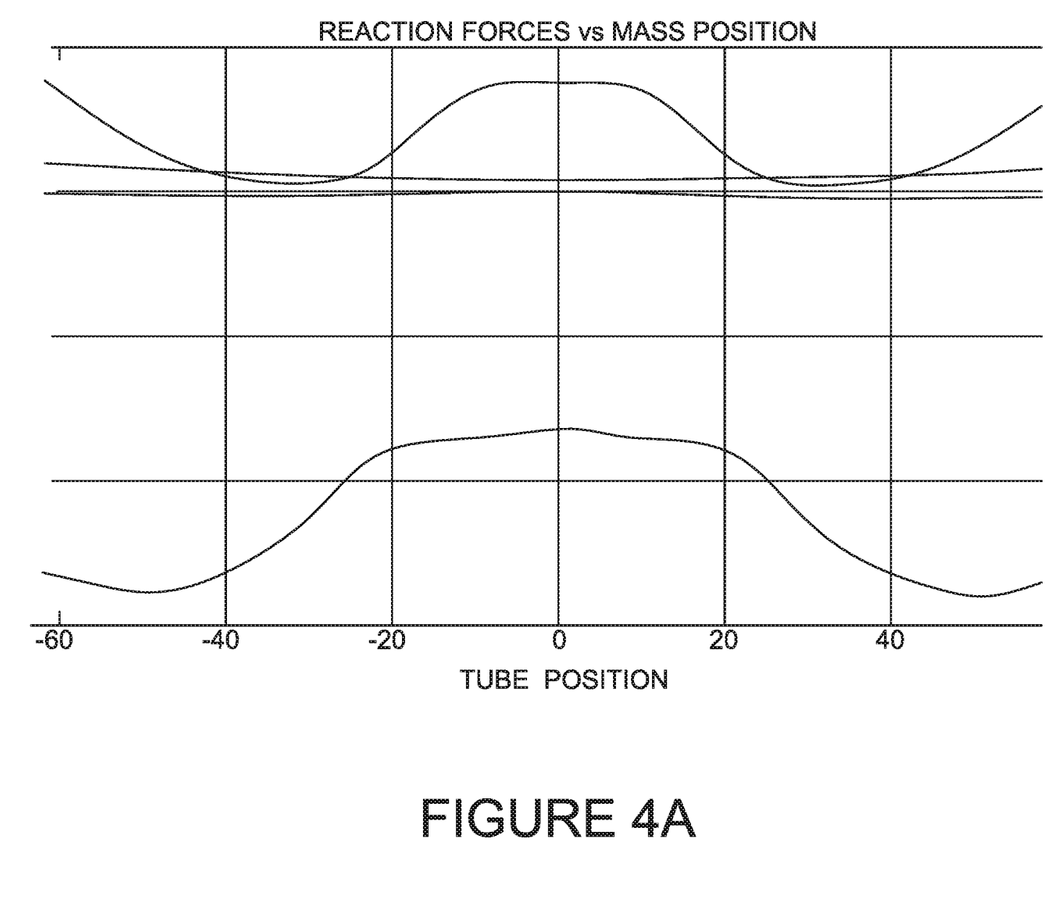
FIG. 4A is a graph of reaction forces vs. test mass location for a given balance analysis.
Figure 4B:
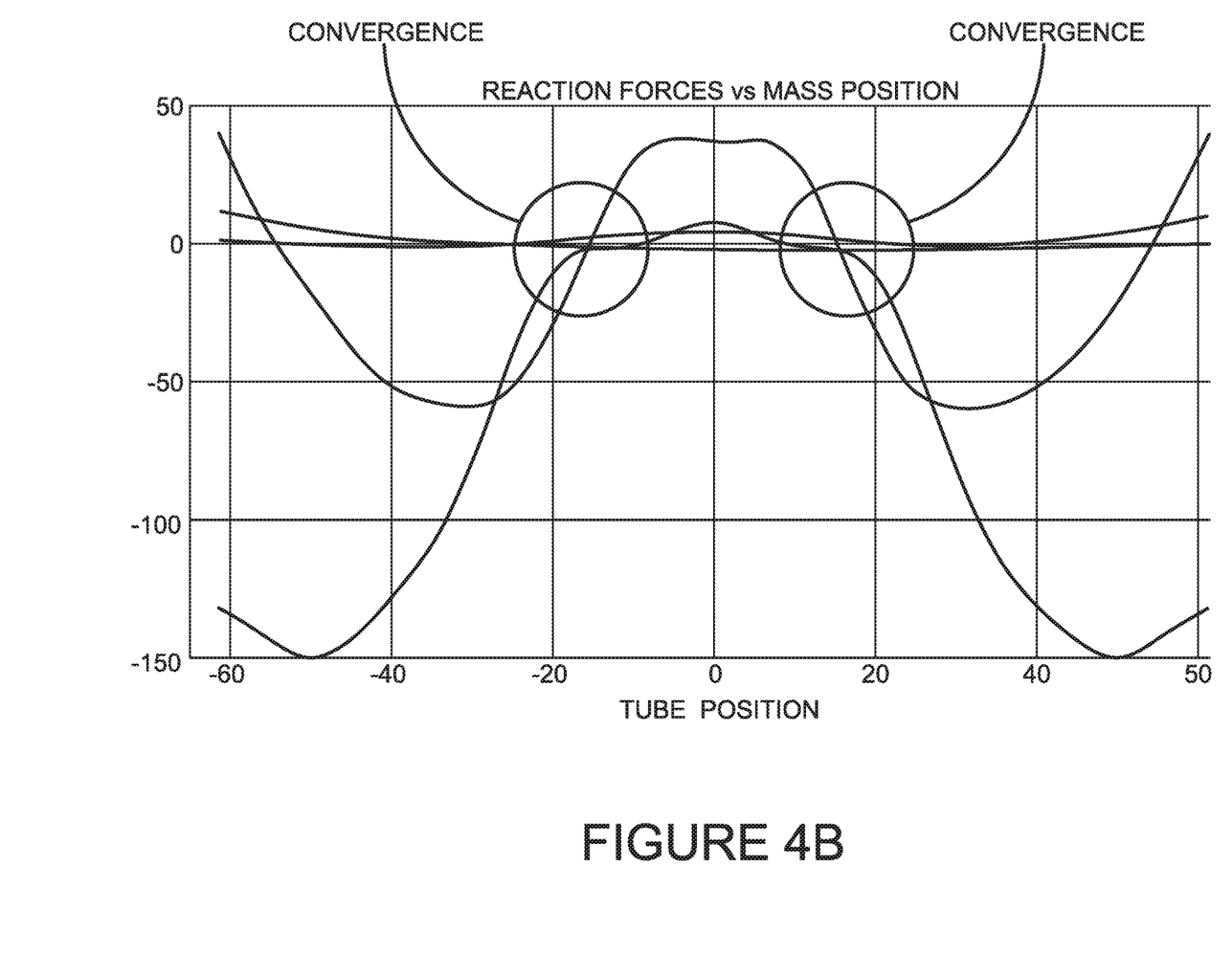
FIG. 4B is a graph of reaction forces vs. scaled test mass location for a given balance analysis.

FIG. 4A is a graph showing one example implementation where the reaction forces from the application of four symmetrically disposed test masses of 25 grams each as a function of test mass locations along the tube. The center of the graph at position zero is where the four test masses may be located at the top center of the tube where X-direction is zero according to the orientation triad 115. The graph shows finite reaction forces for four reactions, which are forces in the X-direction from the drive mode and the twist mode, and forces in the Y-direction from the drive mode and the twist mode. These four reaction forces do not converge to a zero result at any of the positions shown on the graph of FIG. 4A. Since a test mass of 25 grams was used to determine the graph of FIG. 4A, and since the reaction forces are scalable, an algorithm can be applied to scale the curves to reflect larger or smaller test masses. FIG. 4B is the result of using an algorithm to scale the results of the test masses up to find the mass that minimizes the reaction forces. FIG. 4B shows that at a scaled mass of 67 grams, the four reactions nearly converge to a best balance solution by placing 67 gram masses at locations +15 and −15 along the tube symmetrically from center. FIG. 3 shows approximately the solution masses and their positions along the tubes.

FIG. 4A is a graph of reaction forces compared to test mass location for a given balance analysis using FEA results. Four reaction forces are shown not to converge to a best balance solution point.

FIG. 4B is a graph of reaction forces compared to scaled test mass location for a given balance analysis using FEA results. Four reaction forces are shown which nearly converge to a balanced solution point.

In a method to balance a Coriolis mass flow meter tube structure, the method may comprise the following steps. First, the first flow tube 101 and the second flow tube 102 may be vibrated in opposition to each other. Reaction forces 116a, 117a, and 118a in the x, y, and z direction proximate the base of the first end 101a and the reaction forces 116c, 117c, and 118c proximate the base of the second end 101b of the first flow tube 101 are determined. Reaction forces 116b, 117b, 118b proximate the base of the first end 102a of the second flow tube 102 and the reaction forces 116d, 117d, 118d proximate the base of the second end 102b of the second flow tube 102 are determined. A first reaction force cancellation value is determined. In one implementation, this may be a summation of the reaction forces proximate the base of each end of each flow tube. The first balance mass may be positioned to the first flow tube at a first location. The second balance mass may be positioned to the second flow tube at a second location. A second reaction force cancellation value is determined in a similar manner as the first reaction force calculation value. The first reaction force cancellation value and the second force reaction cancellation value are compared. If the difference between the first reaction force calculation and the second reaction force calculation is zero, close to zero, or at an acceptable level or number, the first balance mass and the second balance mass may maintain positions as it indicates a balanced Coriolis mass flow meter with minimal vibration effects. If the difference between the first reaction force calculation and the second reaction force calculation is not acceptable, the first balance mass and the second balance mass are moved. The steps of determining the reaction forces are successively repeated as many times as needed until the difference between the first reaction force and the second reaction force is zero, near zero, or at an acceptable level or number. A driven mode of vibration of the meter may be identified that may comprise the twist mode shape and the drive mode shape. Then the optimized balanced condition for the Coriolis flow meter may be found when all the reaction forces are minimized for the drive mode shape and the twist mode shape.

In one implementation, the method may further comprise the step of positioning a plurality of balance masses on the first flow tube and the second flow tube such that the plurality of balance masses is axially and radially symmetrically positioned on the first flow tube and the second flow tube. By way of example, any number of balance masses may be utilized with sound engineering judgment. In one implementation, two balance masses may be positioned on each fluid flow tube, which may comprise a first balance mass, a second balance mass, a third balance mass, and a fourth balance mass. In another implementation, each balance mass may be positioned and repositioned until the optimized location is found. In another implementation, each of the balance masses may be symmetrically positioned about the XY plane and the YZ plane.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A Coriolis mass flow meter, comprising:
   a first flow tube having a first end and a second end, the first end having a first reaction force, and the second end having a second reaction force;
   a second flow tube operably connected to the first flow tube, the second flow tube having a first end and a second end, the first end having a third reaction force, and the second end having a fourth reaction force;
   a drive system operably connected to the first flow tube and the second flow tube;
   at least one balance mass operably attached to one the first flow tube or the second flow tube, the one balance mass sized and positioned to minimize one or more of the first reaction force, the second reaction force, the third reaction force, and the fourth reaction force; and
   a driven mode comprising a twist mode shape and a drive mode shape, wherein the meter is configured to have an optimized balanced condition when one or more of the first reaction force, the second reaction force, the third reaction force, and the fourth reaction force are minimized for the twist mode shape and the drive mode shape.

2. The Coriolis mass flow meter of claim 1, wherein the first reaction force is a resultant of reaction forces in the x, y, and z directions.

3. The Coriolis mass flow meter of claim 1, wherein the second reaction force is a resultant of reaction forces in the x, y, and z directions.

4. The Coriolis mass flow meter of claim 1, wherein the third reaction force is a resultant of reaction forces in the x, y, and z directions.

5. The Coriolis mass flow meter of claim 1, wherein the fourth reaction force is a resultant of reaction forces in the x, y, and z directions.

6. The Coriolis mass flow meter of claim 1, further comprising a second balance mass operably connected to the first flow tube or the second flow tube sized and positioned to minimize one or more of the first reaction force, the second reaction force, the third reaction force, and the fourth reaction force.

7. The Coriolis mass flow meter of claim 6, further comprising a third balance mass and a fourth balance mass, the first balance mass and the second balance mass disposed on the first flow tube, the third balance mass and the fourth balance mass disposed on the second flow tube.

8. The Coriolis mass flow meter of claim 7, wherein each of the balance masses are symmetrically disposed relative to each other in the axial and radial directions along the first flow tube and the second flow tube.

9. The Coriolis mass flow meter of claim 1, the drive system further comprising a motion driving magnet and a motion driving coil.

10. The Coriolis mass flow meter of claim 9, the drive system further comprising a motion sensing magnet and motion sensing coil, the motion sensing magnet and motion sensing coil distally located from the motion driving magnet and the motion driving coil.

11. The Coriolis mass flow meter of claim 1 further comprising a first brace bar operably connected to the first end of the first flow tube and the first end of the second flow tube, and a second brace bar operably connected to the second end of the first flow tube and second first end of the second flow tube.

12. A method to balance a Coriolis mass flow meter tube structure, comprising the steps of:
vibrating a first flow tube and a second flow tube in opposition to each other;
determining reaction forces in the x, y, and z direction at a first end and a second end of the first flow tube and a first end and a second end of the second flow tube;
combining the reaction forces;
determining a first reaction force cancellation value;
positioning at least a first balance mass to the first flow tube at a first location and a second balance mass to the second flow tube at a second location;
determining a second reaction force cancellation value;
determining a change between the first reaction force cancellation value and the second force reaction cancellation value;
calculating an optimized location and mass for the at least first balance mass and the at least second balance mass so that the change between the first reaction force cancellation value and the second force cancellation value is substantially zero;
identifying a driven mode of vibration of the meter comprising a twist mode shape and a drive mode shape; and optimizing a balanced condition for the meter when all reaction forces are minimized for the drive mode shape and the twist mode shape.

13. The method of claim 12, further comprising the step of:
positioning a plurality of balance masses on the first flow tube and the second flow tube such that the plurality of balance masses is axially and radially symmetrically positioned on the first flow tube and the second flow tube.

14. The method of claim 12, further comprising the steps of:
determining a resultant reaction force at the first end and the second end of the first flow tube and the first end and the second end of the second flow tube for four resultant reaction forces;
determining a change between the first reaction force cancellation value, the second force reaction cancellation value, the third reaction force and the fourth reaction force; and,
calculating an optimized location and mass for the at least first balance mass, the at least second balance mass, a third balance mass, and a fourth balance mass so that the change between the first reaction force cancellation value and the second force cancellation value is substantially zero.

15. The method of claim 12, wherein the first flow tube and the second flow tube define an XY plane and a YZ plane,
positioning each of the balance masses symmetrically about the XY plane and the YZ plane.

16. The method of claim 15, further comprising the step of selectably positioning each of the balance masses to counteract the four reaction forces; and
minimizing vibration of the flow meter.

17. The method of claim 12, wherein the first flow tube and the second flow tube comprise a diameter ranging from about 1 mm to about 12 inches.

18. The method of claim 12, wherein the first flow tube and the second flow tube may be one or more of straight shaped, S-shaped, B-shaped, omega shaped, and/or bent tubes.

* * * * *